Dec. 26, 1967  H. MATTERN  3,360,223
DEVICE FOR PRODUCING DIRECTIONAL VIBRATION
IN ECCENTRIC VIBRATORS
Filed Oct. 21, 1965
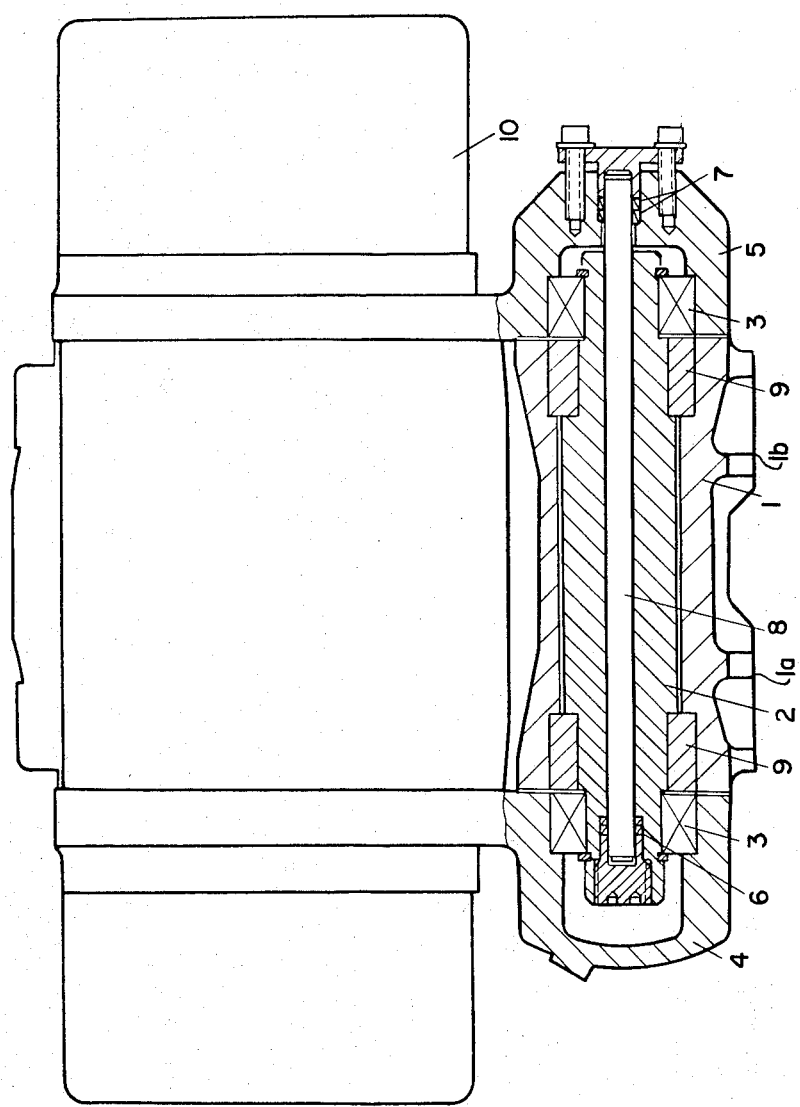
INVENTOR.
HORST MATTERN
BY
Robert H. Jacob
AGT.

United States Patent Office 3,360,223
Patented Dec. 26, 1967

3,360,223
DEVICE FOR PRODUCING DIRECTIONAL
VIBRATION IN ECCENTRIC VIBRATORS
Horst Mattern, Munich, Germany, assignor to Hermann
Wacker and Peter Wacker, Munich, Germany
Filed Oct. 21, 1965, Ser. No. 499,968
Claims priority, application Germany, Nov. 14, 1964,
W 37,960
2 Claims. (Cl. 248—20)

ABSTRACT OF THE DISCLOSURE

Eccentric vibrator for compacting materials comprising a hollow shaft with a torsion rod arranged therein which consumes the forces in horizontal direction while the force components in vertical direction are transmitted in full strength by the hollow shaft, and where the components are enclosed in a dust-proof housing.

---

This invention relates to vibrators for compacting materials and more in particular to a device for producing directional vibrations in eccentric vibrators.

It is known for producing directional vibrations in eccentric shakers to arrange a pair of eccentric vibrators to work in opposite directions on a supporting plate or on a form. Such a measure which requires the use of two eccentric vibrators is expensive and demands considerable space which is available only in the minority of cases.

Eccentric vibrators are also known which have a vibration generator that is journalled in pendulum fashion in a metallic bearing support and elastically restrained, where a rubber element subjected only to torsion provides the elastic restraint and which is disposed alongside a bearing support coaxially with respect to a pendulum shaft and which is mounted externally of the vibration generator. These vibrators are referred to as pendulum vibrators in which the centrifugal forces which arise at the eccentric shaft are divided into two components. One of these components becomes effective as a directional vibration by way of the pendulum bearing while the component that is perpendicular thereto causes a pendulum swing of the vibration generator and remains ineffective.

The same effect may be achieved when helical springs are provided between the pendulum shaft and the motor housing, or the bearing shield which are subjected to forces of tension and compression.

Centrifugal force vibrators are also known (see for example German Patent No. 881,474) where the correctional effect is produced by one or more cylindrical helical springs which are guided in the housing portion and are disposed parallel to the pendulum shaft.

The two last mentioned forms of construction of known type have the inherent shortcoming that the springs which are utilized constitute elements which are subject to failure or wear and one of them is additionally vulnerable to the effects of weather, to aggressive media such as concrete wash etc., because the springs are exposed.

With this type of pendulum vibrators for producing directional vibrations there arise disadvantages that are traced to the use of rubber elements. Thus, rapid aging of the rubber results from the effects of weather, impurities and oil. At the same time the heating of the rubber elements due to high numbers of rotation, such as are customarily used where pendulum vibrators are employed for the compacting of concrete may well have a damaging effect on the rubber elements.

It is, therefore, an object of the present invention to benefit from the knowledge derived from experience and to produce directional vibrations in eccentric vibrators by means of pendulum vibrators which avoid the shortcomings of the known structures.

For this purpose the invention proposes to provide the correctional effect in that a torsion rod arranged in a hollow shaft consumes the components of the forces in horizontal direction, while on the other hand the components in vertical direction are transmitted by the hollow shaft in full strength.

The device in accordance with the invention makes possible a fully enclosed manner of construction. The penetration of impurities and oil is prevented. The torsion rod may be of simple construction, i.e., without notches, shoulders or offsets and the entire device forms a robust and non-sensitive structure which at the same time is economical.

In accordance with a further feature of the invention the hollow shaft and the torsion rod constitute a unit which is firmly secured in the support at one end but movably arranged in bearings in the bearing shield and guided in bearings at the other end of the support but securely anchored in a bearing shield.

Further features and advantages of the invention will become apparent from the following description with reference to the accompanying drawing.

FIG. 1 illustrates the device in accordance with the invention with the salient features shown in section. A hollow shaft 2 is firmly anchored by way of rings 9 to a standard or support 1 having left and right ends 1a and 1b, respectively. This hollow shaft 2 is guided in bearing housings 4 and 5 by means of bearings 3. A torsion rod 8 is disposed inside the hollow shaft 2 and is firmly connected with the hollow shaft by way of tensioning members 6 as shown at the left, in the drawing and with the bearing housing 5 by way of tensioning members 7 as shown at the right in the drawing. The eccentric vibrator is indicated at 10.

The vibrator 10 which is shown in connection with the present invention is of a type that has a motor that is disposed above the base or support 1. The shaft of the motor extends from both ends of the motor and an eccentric is secured to each shaft end. As the vibrator rotates it develops vertical forces which are transmitted by way of the hollow shaft 2 to the support 1 and horizontal forces which are applied to the right hand end of the torsion rod 8 which is firmly connected to the bearing housing 5. At the left hand end the torsion rod is supported in the bearing housing 4 by the way of tensioning member 6, hollow shaft 2 and bearing 3. As a result the lateral forces which are reflected as twisting movements on the right hand end of the torsion rod 8, are absorbed in the rod.

The path of the transmission of forces in the embodiment illustrated extends from the vibrator 10 by way of bearing housings 4 and 5 and bearings 3 to the hollow shaft 2 and thence by way of rings 9 to the base or support 1 which, in turn, is secured to the form which contains the material to be compacted.

Having now described my invention with reference to the embodiment illustrated, I do not wish to be limited thereto, but what I desire to protect by Letters Patent is set forth in the appended claims.

I claim:
1. A device for producing directional vibrations in eccentric vibrators where the centrifugal forces developed at the eccentric shaft are divided into two components, one of said components being effective as a directional vibration by way of a pendulating bearing and the other of said components being directed perpendicularly to said one component and absorbed by elastic elements causing a pendulum swing of the vibration generator, thereby becoming ineffective, said device comprising a support structure having opposite ends, first bearings in said opposite ends, a hollow shaft anchored to said support structure by way of said first bearings, a vibrator having bearing housings disposed endwise of said hollow shaft, second bearings in said housings for said hollow shaft, a torsion rod disposed in said hollow shaft, tension elements disposed intermediate said torsion rod and one end of said hollow shaft and tension elements intermediate the other end of said torsion rod and the adjacent end of said support structure.

2. A device in accordance with claim 1, where said other end of said torsion rod projects from said hollow shaft into said adjacent end of said support structure.

References Cited

UNITED STATES PATENTS 2,724,983  11/1955  O'Connor _____ 188—1 X

DUANE A. REGER, *Primary Examiner.*